(12) United States Patent
Gorecki

(10) Patent No.: US 9,951,688 B2
(45) Date of Patent: Apr. 24, 2018

(54) LOW PRESSURE SHAFT

(71) Applicant: ROLLS-ROYCE plc, London (GB)

(72) Inventor: Andrzej Gorecki, Derby (GB)

(73) Assignee: ROLLS-ROYCE plc, London (GB)

( * ) Notice: Subject to any disclaimer, the term of this patent is extended or adjusted under 35 U.S.C. 154(b) by 244 days.

(21) Appl. No.: 14/813,790

(22) Filed: Jul. 30, 2015

(65) Prior Publication Data

US 2016/0061107 A1 Mar. 3, 2016

(30) Foreign Application Priority Data

Aug. 29, 2014 (GB) .................................... 1415286.2

(51) Int. Cl.
*F02C 3/04* (2006.01)
*F01D 5/02* (2006.01)
*F01D 5/06* (2006.01)

(52) U.S. Cl.
CPC .............. *F02C 3/04* (2013.01); *F01D 5/025* (2013.01); *F01D 5/026* (2013.01); *F01D 5/066* (2013.01); *F05D 2240/60* (2013.01)

(58) Field of Classification Search
CPC .......... F01D 5/025; F01D 5/026; F01D 5/066; F04D 29/044; F04D 29/054
See application file for complete search history.

(56) References Cited

U.S. PATENT DOCUMENTS

| | | | | |
|---|---|---|---|---|
| 5,813,214 A * | 9/1998 | Moniz | ..................... | F01D 25/18 415/175 |
| 6,447,252 B1 * | 9/2002 | Barker | ..................... | F01D 5/025 416/204 A |
| 8,287,242 B2 * | 10/2012 | Bifulco | ..................... | F01D 5/066 415/216.1 |
| 2014/0193266 A1 * | 7/2014 | Krishnamurthy | ....... | F16D 1/076 416/204 A |

FOREIGN PATENT DOCUMENTS

| | | |
|---|---|---|
| EP | 0 852 286 A2 | 7/1998 |
| EP | 2 071 139 A2 | 6/2009 |
| EP | 2 186 997 A2 | 5/2010 |
| RU | 2 522 233 C1 | 7/2014 |

OTHER PUBLICATIONS

Apr. 8, 2016 Extended Search Report issued in European Patent Application No. 15179057.3.
Feb. 16, 2015 Search Report issued in British Application No. 1415286.2.

* cited by examiner

*Primary Examiner* — Richard Edgar
*Assistant Examiner* — John S Hunter
(74) *Attorney, Agent, or Firm* — Oliff PLC

(57) ABSTRACT

A low pressure shaft is provided for interconnecting a fan or low pressure compressor of a gas turbine engine with a low pressure turbine of the engine. The shaft has an aft section whose diameter expands progressively with distance along the rearward direction of the engine. The shaft further has an (Continued)

annular joint portion at the rear end of the aft section for joining the shaft to a drive arm of the low pressure turbine. The rate of expansion of the diameter of the aft section decreases with distance along the rearward direction of the engine.

11 Claims, 3 Drawing Sheets

LOW PRESSURE SHAFT

FIELD OF THE INVENTION

The present invention relates to a low pressure shaft for interconnecting a fan or low pressure compressor of a gas turbine engine with a low pressure turbine of the engine

BACKGROUND OF THE INVENTION

Internal interconnecting shafts are major parts of gas turbine engines. Their prime purpose is to transmit driving power from the turbine to the compressor end of a rotor. Within a two or three shaft engine the innermost rotor is the low pressure (LP) rotor which transmits power from the LP turbine to the fan or LP compressor. Typically, the LP shaft carries the highest torque load of any of the shafts.

Shaft joints may have to carry a combination of torque, axial load and bending moment. Three basic types of joint are in use, namely: bolted joints, splines and curvic couplings. Bolted joints are relatively low cost, but splined and curvic couplings have higher torque-carrying capabilities due to their use of interlocking teeth.

FIG. 1 shows schematically a longitudinal cross-section through the rear portion of a low pressure shaft of an engine. A cylindrical section 100 of the rear portion extends forwardly towards the compressor end of the rotor. At the rear end of the cylindrical portion, the shaft has an aft section 102 or "cone" whose diameter expands progressively with distance along the rearward direction of the engine to terminate in one side of an annular curvic coupling 104. The other side of the coupling is the inner end of a drive arm 106 which extends, coaxially with the shaft, radially inwardly from the low pressure turbine 108 of the engine. A stubshaft 110 extending rearwardly from the joint provides a location for supporting bearings (not shown) for the shaft.

SUMMARY OF THE INVENTION

An object of the present invention is to reduce the mass of low pressure shaft and/or to reduce peak stresses in the shaft.

Accordingly, in a first aspect, the present invention provides a low pressure shaft for interconnecting a fan or low pressure compressor of a gas turbine engine with a low pressure turbine of the engine, the shaft having an aft section whose diameter expands progressively with distance along the rearward direction of the engine, and an annular joint portion at the rear end of the aft section for joining the shaft to a drive arm of the low pressure turbine;
  wherein the rate of expansion of the diameter of the aft section decreases with distance along the rearward direction of the engine.

For example, the aft section can be considered as having a forward portion and a rearward portion, the forward portion having a greater rate of expansion of diameter than the rearward portion.

Advantageously, by shaping the aft section so that the rate of expansion of its diameter decreases with rearward distance, it is possible to reduce the peak stresses in the shaft adjacent the joint with the drive arm, and/or to reduce the mass of the shaft without reducing shaft performance.

It will be understood that the rate of expansion of the diameter of the aft section may continually decrease with distance along the rearward direction of the engine, or alternatively the aft section may have a discrete forward portion and a discrete rearward portion, the forward portion having a greater rate of expansion of diameter than the rearward portion.

In a second aspect, the present invention provides a gas turbine engine having the low pressure shaft of the first aspect interconnecting a fan or low pressure compressor of the engine with a low pressure turbine of the engine Optional features of the invention will now be set out. These are applicable singly or in any combination with any aspect of the invention.

The shaft may be substantially cylindrical forward of the aft section.

On a longitudinal cross-section through the shaft, the aft section may have an elliptical section profile. Such a profile can very efficiently distribute stresses along the aft section. However, the curved walls of the elliptical section profile can be difficult to manufacture. Accordingly, another option is to form the aft section as an axial row of two or more frustoconical sub-sections, wherein, for each pair of adjacent frustoconical sub-sections, the cone angle of the rearward sub-section is less than the cone angle of the forward sub-section. The frustoconical sub-sections, having substantially straight-sided walls, can be easier to manufacture than the elliptical section profile. Further, the more frustoconical sub-sections are used, the closer the aft section approximates to a section having the elliptical section profile.

The annular joint portion may be configured to form a curvic coupling with the drive arm.

The wall thickness of the aft section may decrease with distance along the rearward direction of the engine. For example, regions with decreasing wall thickness (typically at the front end of the aft section) may occupy at least 50% of the axial extent of the aft section. The remaining regions of the aft section (typically at the rear end of the aft section) may then be of substantially constant wall thickness.

The shaft may further have an annular stiffening formation which bridges the rear end of the aft section and the joint portion, the wall thickness of the stiffening formation being greater than the wall thickness of the aft section at its rear end. For example, the wall thickness of the stiffening formation may increase to be about double that of the wall thickness of the aft section at its rear end. Such a stiffening formation can reduce component movement at the joint with the drive arm, displacing such movement forward into plane stress regions of the aft section. Another option, however, is to form the stiffening formation such that it curves radially outwardly from the rear end of the aft section. In such a case, the stiffening formation may have the same wall thickness as the wall thickness of the aft section at its rearmost end. The axial length of the stiffening formation may be less than 5%, for example less than 2%, of the axial length of the aft section.

The drive arm can be a frustoconical section which extends, coaxially with the shaft, radially inwardly from the low pressure turbine.

BRIEF DESCRIPTION OF THE DRAWINGS

Embodiments of the invention will now be described by way of example with reference to the accompanying drawings in which.

DETAILED DESCRIPTION

Figure 2:
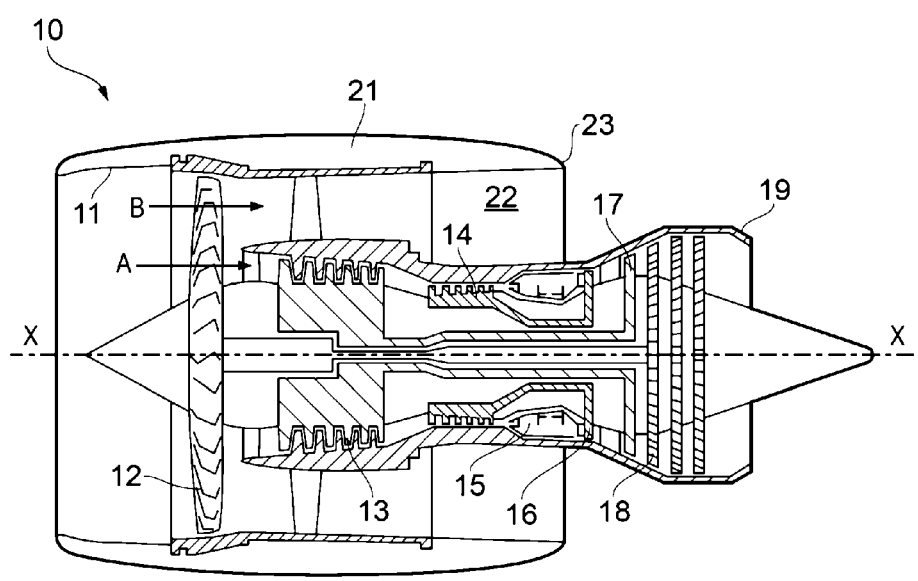
FIG. 2 shows a longitudinal cross-section through a ducted fan gas turbine engine.

With reference to FIG. 2, a ducted fan gas turbine engine is generally indicated at 10 and has a principal and rotational axis X-X. The engine comprises, in axial flow series, an air intake 11, a propulsive fan 12, an intermediate pressure (IP) compressor 13, a high pressure (HP) compressor 14, combustion equipment 15, an HP turbine 16, an IP turbine 17, an LP turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The IP compressor 13 compresses the air flow A directed into it before delivering that air to the HP compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the HP, IP and LP turbines 16, 17, 18 before being exhausted through the nozzle 19 to provide additional propulsive thrust. The HP, IP and LP turbines respectively drive the HP and IP compressors 14, 13 and the fan 12 by suitable interconnecting shafts.

Figure 3:
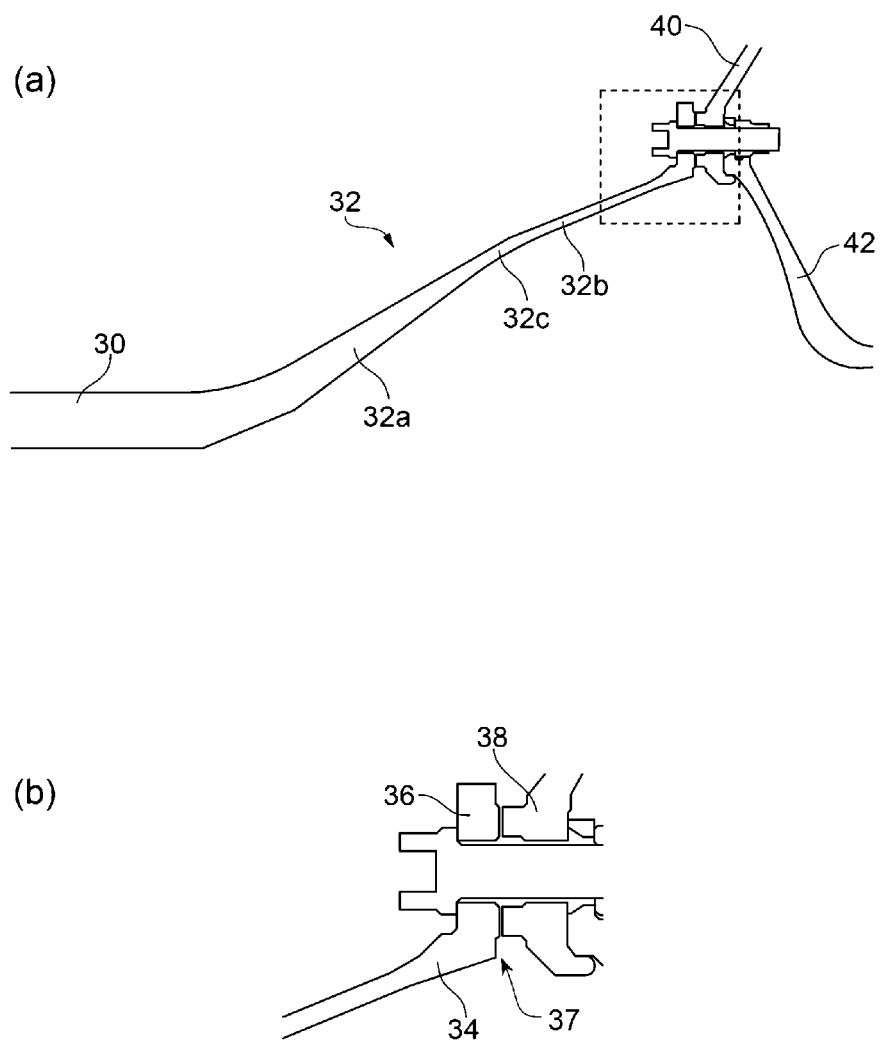
FIG. 3 shows schematically (a) a longitudinal cross-section through the rear portion of the low pressure shaft of the engine of FIG. 2, and (b) a close-up view of a selected area of the cross-section.

FIG. 3 shows schematically (a) a longitudinal cross-section through the rear portion of the LP interconnecting shaft of the engine of FIG. 2, and (b) a close-up view of a selected area of the cross-section. The shaft has a cylindrical section 30 which extends forwardly towards the fan. An aft section 32 then extends rearwardly from the cylindrical section. The diameter of the aft section expands progressively with distance along the rearward direction of the engine. A short annular stiffening portion 34 bridges the rear end of the aft section and an annular joint portion 36 which forms a joint 37 with a corresponding joint portion 38 at the end of a frustoconical drive arm 40 extending inwardly from the LP turbine. A stubshaft 42 extends rearwardly from the joint 37. The joint 37 may be a curvic joint.

Figure 1:
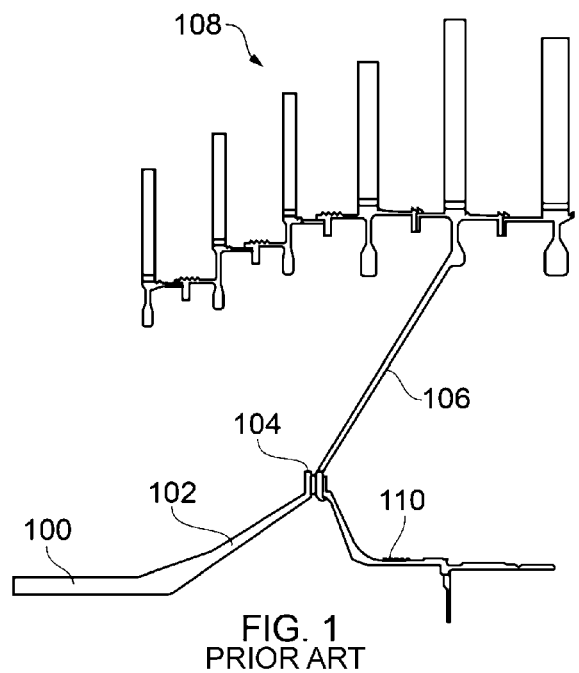
FIG. 1 show schematically a longitudinal cross-section through the rear portion of a low pressure shaft of a gas turbine engine.

The LP shaft differs in important respects from the shaft shown in FIG. 1.

Firstly, the aft section 32 is configured such that the rate of expansion of its diameter decreases with distance along the rearward direction of the engine. This is achieved by forming the aft section as two frustoconical sub-sections 32a, 32b, with the cone angle of the front subsection 32a being larger than that of the rear subsection 32b. The two sub-sections are produced in respective forging operations, with a bend 32c being formed at the boundary of the forging envelopes, and the front sub-section being longer than the rear sub-section. The aft section decreases gradually in wall thickness over the length of the front sub-section, and is approximately of constant wall thickness over the length of the rear sub-section. By adopting such a configuration, the diameter of the aft section is increased in regions close to the joint portion 36, which allows the shaft to carry a greater torque and/or to have a thinner wall for a given torque.

Figure 4:
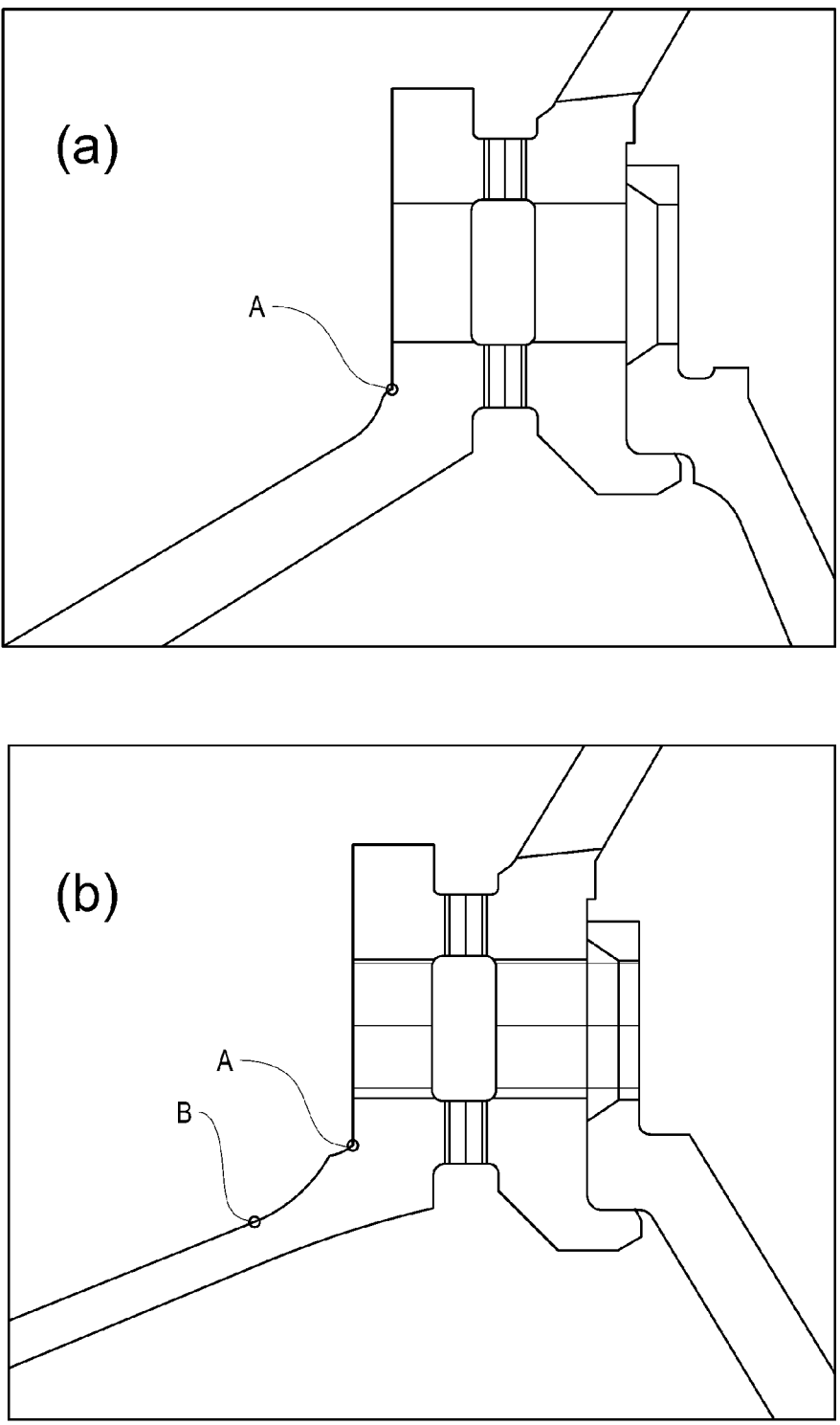
FIG. 4 shows finite element analysis (FEA) contours of von Mises stress for the joint region at the rear end of (a) an aft section of a shaft having the geometry of FIG. 1, and (b) an aft section of a shaft having the geometry of FIG. 3

Secondly, the stiffening portion 34 can reduce component movement in the region of the joint portion 36, where stress-raising shape complexities can lead to high peak stresses, and help to displace such movement into the plane stress region of the aft section 32. In particular, the wall thickness of the shaft increases at the stiffening portion relative to its thickness at the rear end of the aft section 32. Referring to FIG. 4(a), there is a region of high von Mises stress at the meeting point of the aft section and the joint portion (indicated by arrow A) of a shaft having the geometry of FIG. 1, whereas in FIG. 4(b), illustrating a shaft having the geometry of FIG. 3, this meeting point (indicated by arrow A) is mediated by the increased wall thickness of the stiffening portion and the region of high von Mises stress is eliminated from the meeting point. With reference to FIG. 4(b), the von Mises stress at a position forward of the meeting point (indicated by arrow B) is higher than at the meeting point (indicated by arrow A).

In large turbofan applications, it is estimated that changes to the aft section of the LP shaft such as those discussed above can provide weight savings or around 7 kg without reducing shaft performance.

Instead of forming the aft section 32 as two frustoconical sub-sections 32a, 32b it is possible to form it as an axial series of three or more such sub-sections, with the sub-section cone angle decreasing the closer a given sub-section is to the joint region. The increased manufacturing complexity of such configurations may be balanced by improved shaft performance. Indeed, another option is to form the aft section with a smoothly varying elliptical section profile, thereby avoiding bends between sub-sections.

An alternative to an increased thickness stiffening portion 34 is to form the stiffening portion as a continuation of the rear end of the aft section, i.e. preserving the same wall thickness, but which curves radially outwardly from the rear end.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A low pressure shaft for interconnecting a fan or low pressure compressor of a gas turbine engine with a low pressure turbine of the gas turbine engine, the low pressure shaft comprising:
    a cylindrical section extending forwardly toward the fan or low pressure compressor;
    an aft section extending rearward from a rear end of the cylindrical section, the aft section having a diameter that expands progressively with distance along a rearward direction of the gas turbine engine; and
    an annular joint portion at a rear end of the aft section, the annular joint portion being configured to be joined to a drive arm of the lower pressure turbine,
    wherein the aft section has an axial length extending from the cylindrical section to the annular joint portion, and the diameter of the aft section expands progressively in the rearward direction along an entirety of the axial length of the aft section, and wherein the rate of expansion of the diameter of the aft section decreases with distance along the rearward direction of the gas turbine engine.

2. The low pressure shaft according to claim 1, wherein the aft section is formed as an axial row of two or more frustoconical sub-sections, for a pair of adjacent frustoconical sub-sections of the two or more frustoconical sub-sections, a cone angle of a rearward sub-section of the pair of adjacent frustoconical sub-sections being less than a cone angle of a forward sub-section of the pair of adjacent frustoconical sub-sections.

3. The low pressure shaft according to claim 1, wherein the annular joint portion is configured to form a curvic coupling with the drive arm.

4. The low pressure shaft according to claim 1, wherein a wall thickness of the aft section decreases with distance along the rearward direction of the engine.

5. The low pressure shaft according to claim 1 further comprising an annular stiffening formation which bridges the rear end of the aft section and the annular joint portion, a wall thickness of the annular stiffening formation being greater than a wall thickness of the aft section at the rear end of the aft section.

6. The low pressure shaft according to claim 5, wherein an axial length of the annular stiffening formation is less than 5% of the axial length of the aft section.

7. The low pressure shaft according to claim 6, wherein an axial length of the annular stiffening formation is less than 2% of the axial length of the aft section.

8. The low pressure shaft according to claim 1 further comprising an annular stiffening formation which bridges the rear end of the aft section and the annular joint portion, the annular stiffening formation curving radially outwardly from the rear end of the aft section.

9. The low pressure shaft according to claim 8, wherein an axial length of the annular stiffening formation is less than 5% of the axial length of the aft section.

10. The low pressure shaft according to claim 9, wherein an axial length of the annular stiffening formation is less than 2% of the axial length of the aft section.

11. A gas turbine engine, wherein the low pressure shaft of claim 1 interconnects the fan or low pressure compressor of the gas turbine engine with the low pressure turbine of the gas turbine engine.

* * * * *